United States Patent
Beracha et al.

(10) Patent No.: US 12,549,484 B1
(45) Date of Patent: Feb. 10, 2026

(54) CONGESTION NOTIFICATIONS

(71) Applicant: MELLANOX TECHNOLOGIES, LTD., Yokneam (IL)

(72) Inventors: Eran Gil Beracha, Tel Aviv (IL); Gil Mey-Tal, Tel Aviv (IL); Tal Mund, Herzliya (IL); Ilya Vershkov, Rishon LeZion (IL)

(73) Assignee: Mellanox Technologies, Ltd., Yokneam (IL)

( * ) Notice: Subject to any disclaimer, the term of this patent is extended or adjusted under 35 U.S.C. 154(b) by 9 days.

(21) Appl. No.: 18/796,714

(22) Filed: Aug. 7, 2024

(51) Int. Cl.
- G06F 15/16 (2006.01)
- H04L 47/11 (2022.01)
- H04L 47/122 (2022.01)

(52) U.S. Cl.
CPC ............ H04L 47/122 (2013.01); H04L 47/11 (2013.01)

(58) Field of Classification Search
CPC .............................. H04L 47/11; H04L 47/122
USPC .......................................................... 709/238
See application file for complete search history.

(56) References Cited

U.S. PATENT DOCUMENTS

| | | | | |
|---|---|---|---|---|
| 7,474,616 B2 * | 1/2009 | Connor | ................... | H04L 47/30 370/230.1 |
| 8,787,160 B2 * | 7/2014 | Zhou | ....................... | H04L 47/11 370/230 |
| 8,942,096 B2 * | 1/2015 | Arvidsson | ............... | H04L 47/11 370/235 |
| 8,995,269 B2 * | 3/2015 | Sato | ........................ | H04L 47/12 370/235 |
| 10,039,027 B2 * | 7/2018 | Huang | ................... | H04W 28/14 |
| 10,826,830 B2 * | 11/2020 | Wei | ...................... | H04L 47/263 |
| 10,862,817 B2 * | 12/2020 | Xue | ...................... | H04L 47/193 |
| 10,924,421 B2 * | 2/2021 | Zhang | ..................... | H04L 47/34 |
| 11,115,339 B2 * | 9/2021 | Shen | ..................... | H04L 47/263 |
| 11,546,261 B2 * | 1/2023 | Han | ........................ | H04L 47/27 |
| 11,818,046 B2 * | 11/2023 | Ramakrishnan | ........ | H04L 47/12 |
| 12,363,039 B1 * | 7/2025 | Yi | ........................... | H04L 47/12 |
| 12,413,653 B1 * | 9/2025 | Yi | ........................... | H04W 76/12 |
| 2012/0092988 A1 * | 4/2012 | Zhou | ....................... | H04L 47/70 370/230 |
| 2012/0092995 A1 * | 4/2012 | Arvidsson | ............. | H04W 28/02 370/235 |
| 2012/0147748 A1 * | 6/2012 | Sato | ........................ | H04L 47/12 370/235 |
| 2015/0003280 A1 * | 1/2015 | Colban | ............. | H04W 28/0252 370/253 |

(Continued)

Primary Examiner — Moustafa M Meky
(74) Attorney, Agent, or Firm — Sheridan Ross P.C.

(57) ABSTRACT

Systems, devices, and methods are provided. In one example, a method is described that includes a first device receiving a congestion notification from a second device, wherein the congestion notification is addressed to a source node, and wherein the first device is between the second device and the source node. The method also includes processing the congestion notification and re-routing network traffic based on the congestion notification. The method further includes in response to the first device entering a congested state within a predetermined amount of time after receiving the congestion notification, generating and transferring a second congestion notification to a third device, wherein the second congestion notification is addressed to the source node, and wherein the device switch is between the first device and the source node.

20 Claims, 4 Drawing Sheets

(56) References Cited

U.S. PATENT DOCUMENTS

| | | | |
|---|---|---|---|
| 2016/0014029 A1* | 1/2016 | Yuan | H04L 45/50 |
| | | | 370/236 |
| 2016/0255532 A1* | 9/2016 | Huang | H04W 76/10 |
| | | | 370/235 |
| 2019/0068503 A1* | 2/2019 | Wei | H04L 47/24 |
| 2019/0116126 A1* | 4/2019 | Shen | H04L 47/11 |
| 2019/0215276 A1* | 7/2019 | Xue | H04L 47/2483 |
| 2021/0168076 A1* | 6/2021 | Han | H04L 49/20 |
| 2022/0078118 A1* | 3/2022 | Ao | H04L 47/26 |
| 2022/0239594 A1* | 7/2022 | Ramakrishnan | H04L 49/501 |
| 2023/0208771 A1* | 6/2023 | Han | H04L 47/25 |
| | | | 370/235 |

\* cited by examiner

CONGESTION NOTIFICATIONS

FIELD OF THE DISCLOSURE

The present disclosure is generally directed toward networking and, in particular, toward networking devices and methods of operating the same.

BACKGROUND

Switches and similar network devices represent a core component of many communication, security, and computing networks. Switches are often used to connect multiple devices to form networks.

Devices including but not limited to personal computers, servers, and other types of computing devices, may be interconnected using network devices such as switches. Such interconnected entities may form a network enabling data communication and resource sharing among the nodes. Often multiple potential paths for data flow may exist between any pair of devices. This feature allows data to traverse different routes from a source device to a destination device. Such a network design enhances the robustness and flexibility of data communication as it provides alternatives in case of path failure, congestion, or other adverse conditions. Moreover, such a network design facilitates load balancing across the network, optimizing the overall network performance and efficiency.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes. The computing system, which may be referred to herein as a switch or other networking device, may perform one or more methods involving the generation and sending and/or the receipt and handling of congestion notifications (e.g., adaptive routing notification (ARN) packets, data packet, etc.). Such congestion notifications, as described herein, may be used to reduce congestion throughout a network as well as to avoid issues caused by such congestion.

The present disclosure describes systems, devices, and methods for enabling a switch or other computing system/device to generate congestion notification packets (e.g., ARN packets) based on congestion in a network and to route packets based on received congestion notification packets in such a way as to solve the above-noted shortcomings associated with congestion in the network. As an illustrative example aspect of the systems and methods disclosed, a system may include a first switch including one or more circuits to receive a congestion notification from a second switch, wherein the congestion notification is addressed to a source node, and wherein the first switch is between the second switch and the source node; process the congestion notification and re-route network traffic based on the congestion notification; in response to the first switch entering a congested state within a predetermined amount of time after receiving the congestion notification, generate a second congestion notification; and transfer the second congestion notification to a third switch, wherein the second congestion notification is addressed to the source node, and wherein the third switch is between the first switch and the source node.

In another illustrative example, a device includes one or more circuits to receive a congestion notification from a second device, wherein the congestion notification is addressed to a source node, and wherein the device is between the second device and the source node; process the congestion notification and re-route network traffic based on the congestion notification; in response to the device entering a congested state within a predetermined amount of time after receiving the congestion notification, generate a second congestion notification; and transfer the second congestion notification to a third device, wherein the second congestion notification is addressed to the source node, and wherein the third device is between the device and the source node.

In yet another illustrative example, a network includes a first device comprising one or more circuits to: receive a congestion notification from a second device, wherein the congestion notification is addressed to a source node, and wherein the first device is between the second device and the source node; process the congestion notification and re-route network traffic based on the congestion notification; in response to the first device entering a congested state within a predetermined amount of time after receiving the congestion notification, generate a second congestion notification; and transfer the second congestion notification to a third device, wherein the second congestion notification is addressed to the source node, and wherein the third device is between the first device and the source node.

The above example aspect includes wherein the one or more circuits are further to: in response to congestion in the first device not being resolved within a predetermined amount of time, re-sending the second congestion notification.

The above example aspect includes wherein congestion in the second device is a result of link congestion or link failure.

The above example aspect includes wherein when the first device is directly connected to the source node, the second congestion notification is not generated or transferred.

The above example aspect includes wherein the one or more circuits are further to: generate the second congestion notification in response to determining at least one port in the first device and an associated bandwidth is below a threshold.

The above example aspect includes wherein the congestion in the first device is determined based on a queue latency.

The above example aspect includes wherein the congestion in the first device is determined based on a queue occupancy.

The above example aspect includes wherein re-routing the network traffic comprises using adaptive routing to re-route the network traffic.

The above example aspect includes wherein the congestion notification comprises an Adaptive Routing Notification (ARN).

The above example aspect includes wherein a leaf switch connected to a node does not generate and transfer a congestion notification.

The routing approaches depicted and described herein may be applied to a device, a processor, a Central Processing Unit (CPU), a Field Programmable Gate Array (FPGA), a switch, a router, or any other suitable type of networking device known or yet to be developed. Additional features and advantages are described herein and will be apparent from the following description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
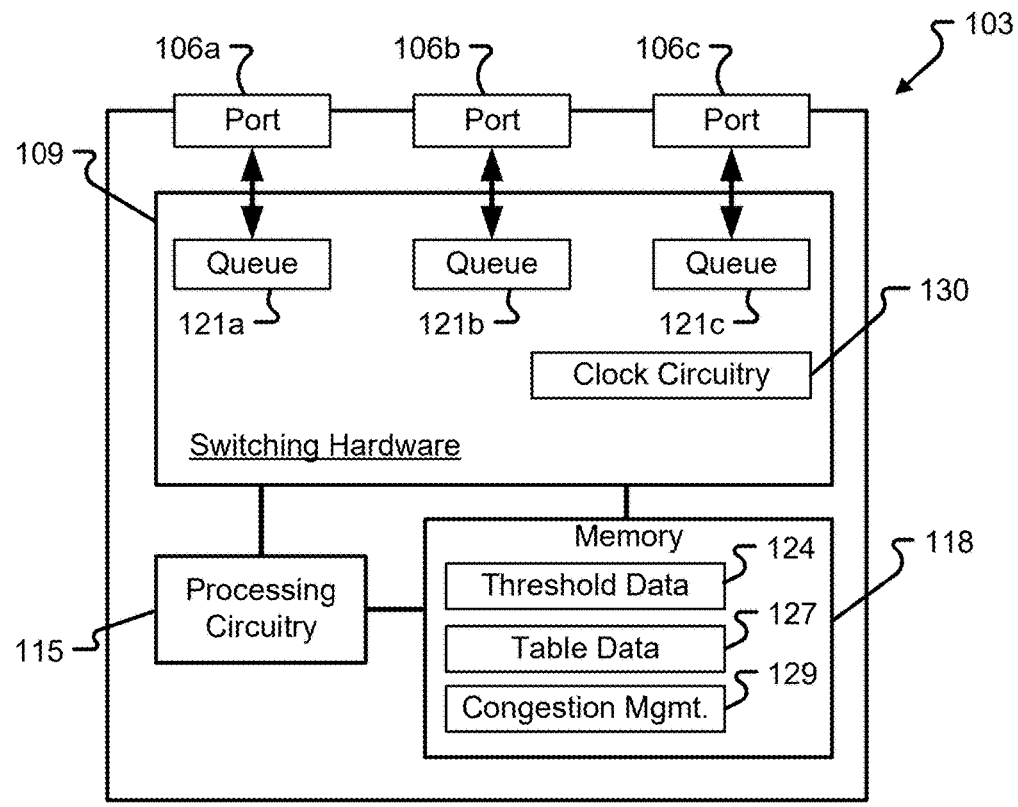
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Explicit congestion notification (ECN) is a feedback scheme that indicates congestion information by marking packets instead of dropping them. The destination of marked packets returns this congestion notification to the source. As a result, the source decreases its transmit rate.

Large-scale supercomputing and AI data centers utilize multipath, such as adaptive routing, to implement load balancing and improve link reliability. Adaptive Routing enables the switch to select the output port based on the port's load. Adaptive routing can dynamically adjust routing policies based on path congestion and failures. When congestion or failure occurs, in addition for the local node to apply adaptive routing, the congestion/failure information also needs to be sent to other nodes in a timely and accurate manner, so as to enforce adaptive routing in other nodes to avoid exacerbating congestion on the path.

In adaptive routing there are multiple but non-equivalent paths between a source and a destination. In most cases, the shortest path is preferred to be selected for forwarding traffic. However, traffic congestion or link failures may occur on the shortest path. To this end, adaptive routing is widely used for nodes to make dynamic routing decisions based on dynamics of network topology (e.g., link failure) as well as variations of traffic (e.g., link congestion). When congestion occurs on the shortest path, the local node that detects it applies adaptive routing and, at the same time, explicitly advertises congestion signals to other remote nodes. In this way, the network selects another non-congested path to forward packets temporarily until congestion elimination signal is received. Adaptive routing enables the network to mitigate traffic collisions and make use of idle links to improve bandwidth utilization.

A congestion notification should be sent to the node in the network that can eliminate the congestion by routing the traffic on a different route. Said another way, the node responsible for causing the congestion should be notified to re-route traffic to resolve/eliminate the congestion. One method of notifying the relevant node is to propagate the information using the method of transferring congestion notifications described herein. Given a big cluster of switches and GPUs, the current methods requires determining which node in the network can eliminate the congestion and knowing its location. These method use may orchestration tools that map each switch's location in the network, or software that allows each switch to determine the exact location of all other switches in the network, and are not scalable and expensive.

When there is congestion, it is certain that the relevant switch that can resolve the congestion is located somewhere between the node that generated the packet, and the switch that generated the congestion notification packet. Using this information, the relevant switch can be notified without having to know the exact location of the relevant switch.

The improved method of propagating congestion notifications through the network may be implemented the following way: switch A identifies congestion and generates a congestion notification. The congestion notification packet header includes uses the IP address of the host that sent the original packet as the destination IP. In this example, the host is connected to the switch D. Switch A routes the congestion notification packet towards the host, choosing any spine switch that is connected to it. In this example, switch A is connected to switches B0 and B1, so switch A selects one or both of the switches B0 and B1 to transfer the congestion notification to. The switch that receives the congestion notification from the switch A, consumes the congestion notification packet. In embodiments, consuming the congestion notification packet includes re-routing network traffic based on the congestion notification. For example, since the switch receiving the congestion notification knows the switch A is congested, it may select another switch for routing traffic. Consuming the congestion notification may also include setting a timer for when the congestion notification was received from the switch A. After some time, the congestion remains since the consumption of the congestion notification packets in either of both the switches B0 and B1 did not solve the issue since in this example only switch D can solve the congestion. Switch A continues to send congestion notifications, resulting in one or both of the switches B0 and B1 to become congested as well. One or both of the switches B0 and B1 generate their own congestion notification packets and send it towards the host (e.g., use the host IP address as the destination IP in the congestion notification. Continuing the example, assume either of both of the switches B0 and B1 transfer their congestion notifications to switch C. Similar to the switches B0 and B1 discussed above, the switch C consumes the congestion notification packet(s). The steps will be repeated until the switch that can resolve the congestion is notified and the congestion is resolved. In other words, the congestion in the switch A may be resolved without knowing the location of the relevant switch (e.g., the switch D).

Referring now to FIGS. 1-5, various systems and methods for routing packets between switches and nodes will be described. The concepts of packet routing depicted and described herein can be applied to the routing of information from one computing device to another. The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

Figure 2:
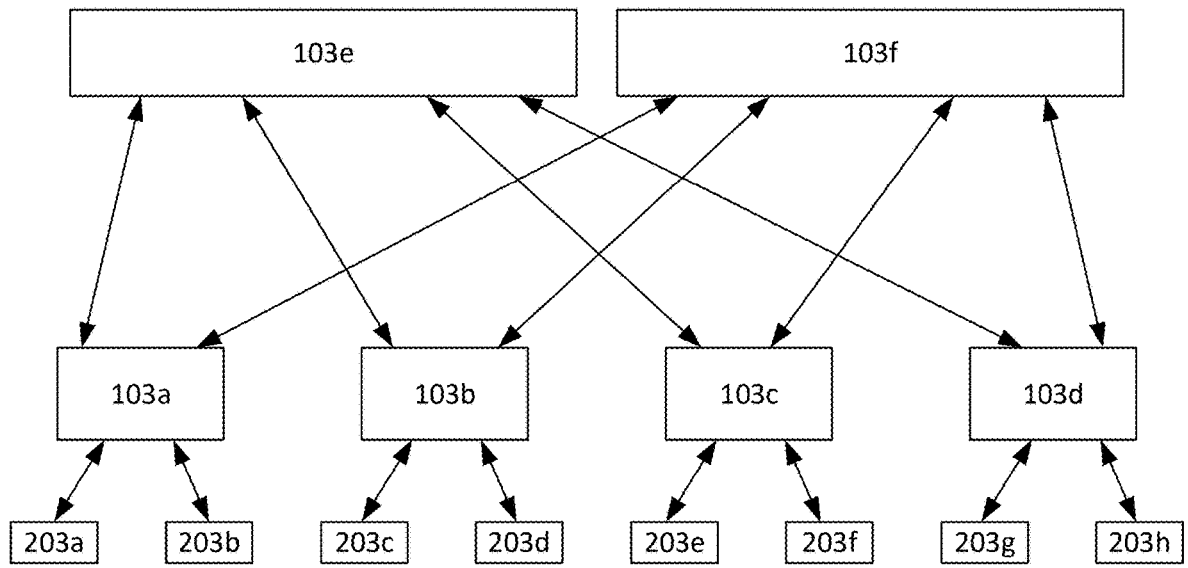
FIG. 2 illustrates a network of computing systems and nodes in accordance with at least some embodiments of the present disclosure.

As illustrated in FIG. 1, a switch 103 as described herein may be a computing system comprising a number of ports 106a-c which may be used to interconnect with other switches 103 and/or computing systems and network devices, which may be referred to as nodes, to make up a network. For example, and as illustrated in FIG. 2, a switch 103 may be a spine switch 103e, 103f and/or a leaf switch 103a-d and may connect to other switches 103 and/or nodes 203a-h. Such a network of switches 103 and nodes 203 may be useful in various settings, from data centers and cloud computing infrastructures to artificial intelligence systems.

Switches 103, as described in greater detail herein, may enable communication between switches 103 and/or nodes 203. A switch 103 may be, for example, a switch, a network interface controller (NIC), or other device capable of receiving and sending data, and may act as a central node in the network. Switches 103 may be wired in a topology including spine switches, top-of-rack (TOR) switches, and/or leaf switches, for example. Switches 103 may be capable of receiving, processing, and forwarding data, e.g., packets, to appropriate destinations within the network, such as other switches 103 and/or nodes 203. In some implementations, a switch 103 may be included in a switch box, a platform, or a case which may contain one or more switches 103 as well as one or more power supply devices and other components.

In some implementations, a switch 103 may comprise one or more ports 106a-c connected to one or more ports of other switches 103 and/or nodes 203. Processes, such as applications executed by nodes 203 may involve transmitting data to other nodes 203 of the network via switches 103. Data may flow through the network of switches 103 and nodes 203 using one or more protocols such as transmission control protocol (TCP), user datagram protocol (UDP), or Internet protocol (IP), for example. Each switch 103 may, upon receiving data from a node 203 or another switch 103 examine the data to identify a destination for the data and route the data through the network.

Data may be routed through the network in routes chosen at least in part based on table data 127 stored in memory 118 of each switch 103 which handles the data. For example, and as described in greater detail herein, a switch 103 may implement an adaptive routing mechanism in which the switch 103 chooses a particular port 106a-c from which to forward a particular packet based on state data in a table. Such state data may indicate an amount of bandwidth, such as in terms of percentage and/or a data rate, for any possible route a packet may take to reach its destination.

Each node 203 may be a computing unit, such as a personal computer, server, or other computing device, and may be responsible for executing applications and performing data processing tasks. Nodes 203 as described herein may range from servers in a data center to desktop computers in a network, or to devices such as internet of things (IoT) sensors and smart devices as examples.

Each node 203 may for example include one or more processing circuits, such as graphics processing units (GPUs), central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, nodes 203 may also or alternatively include hardware such as GPUs for handling intensive tasks for machine learning, artificial intelligence (AI) workloads, or other complex processes.

For example, nodes 203 communicating via switches 103 may operate as a high-performance computing (HPC) cluster. A cluster of nodes 203 may comprise numerous interconnected servers, each equipped with CPUs and/or GPUs. The nodes 203 may provide computational horsepower for, as an example, training large-scale AI models or running complex scientific simulations. For AI and machine learning tasks, the nodes 203 may comprise one or more GPUs or other processing circuitry which may be capable of handling parallel processing requirements of neural networks and other applications.

Nodes 203 may be client devices which, for example, engage in AI-related, research-related, and other processor-intensive tasks, and utilize a network of switches 103 and other nodes 203 to handle the computational loads and data throughput required by such intensive applications. Such nodes 203 may include, for example, workstations and personal computers used by researchers, data scientists, and professionals for developing, testing, and running AI models and research simulations.

A switch 103 as described herein may in some implementations be as illustrated in FIG. 1. Such a switch 103 may include a plurality of ports 106a-c, queues 121a-c, switching hardware 109, processing circuitry 115, and memory 118. The ports 106a-c of a switch 103 may be capable of facilitating the transmission of data packets, or non-packetized data, into, out of, and through the switch 103. Such ports 106a-c may serve as interface points where network cables may be connected, connecting the switch 103 with other switches 103, and/or nodes 203.

Each port 106 may be capable of receiving incoming data packets from other devices and/or transmitting outgoing data packets to other devices. In some implementations, ports 106 may be configured to operate as either dedicated ingress or egress ports 106 or may be enabled to operate in a dual functionality capable of performing ingress and egress functions. For example, an egress port 106 may be used exclusively for sending data from the interconnect device and an ingress port 106 may be used solely for receiving incoming data into the switch.

Switching hardware 109 of a switch 103 may be capable of handling a received packet by determining a port 106 from which to send the packet and forwarding the packet from the determined port 106. Using a system or method as described herein, switching hardware 109 may be capable of adjusting an amount of bandwidth for possible routes for routing packets based on received congestion notifications. Switching hardware 109 may also be capable of generating congestion notifications for sending to other switches 103 in response to received packets based on congestion associated with various destinations and/or ports 106a-c as described herein.

Each port 106 of a switch 103 may be associated with one or more queues 121a-c. When a packet, or data in any format, is to be sent from a port 106, the packet may be stored in a queue 121 associated with the port 106 until the port 106 is ready to send the packet. When congestion occurs, a backlog of data in queues 121 may build. By monitoring an amount of data in each queue, as described herein, the switch 103 may be enabled to determine a congestion associated with each queue 121 and/or a congestion associated with the ports 106 associated with the queues 121.

Switching hardware 109 of a switch 103 may also include clock circuitry 130. Clock circuitry 130 may be used by switching hardware 109 and/or other components of the switch 103 to implement functions such as aging timers and congestion notification timers as described in greater detail below. In some implementations, clock circuitry may comprise a crystal oscillator or other circuit capable of providing an electrical signal at a particular frequency. Clock circuitry 130 may also or alternatively include one or more clock generators and other elements capable of providing counters and timers as described herein.

In support of the functionality of the switching hardware 109, processing circuitry 115 may be configured to control aspects of the switching hardware 109 to adaptive routing in relation to congestion notifications. The processing circuitry 115 may in some implementations include a CPU, an ASIC, and/or other processing circuitry which may be capable of handling computations, decision-making, and management functions required for operation of the switch 103.

Processing circuitry 115 may be configured to handle management and control functions of the switch 103, such as setting up routing tables, configuring ports, and otherwise managing operation of the switch 103. Processing circuitry 115 may execute software and/or firmware to configure and manage the switch 103, such as an operating system and management tools. In some implementations, the processing circuitry 115 may be configured to receive congestion notifications and/or threshold settings from external devices such as other switches 103 and/or nodes 203. Processing circuitry 115 may be capable of adjusting table data 127 and/or threshold data 124, as described in greater detail below, and instructing switching hardware 109 to function in accordance with the table data 127 and threshold data 124.

Memory 118 of a switch 103 as described herein may comprise one or more memory elements capable of storing configuration settings, threshold data 124, table data 127, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats.

Threshold data 124 as described herein may be values to which congestion amounts may be compared. For example, and as described in greater detail below, threshold data 124 may include an upper threshold and a lower threshold. Threshold data 124 may be written to a switch 103 by nodes 203 such as by users such as through the editing of configuration settings or may be programmed through an operating system of the switch 103.

Figure 3:
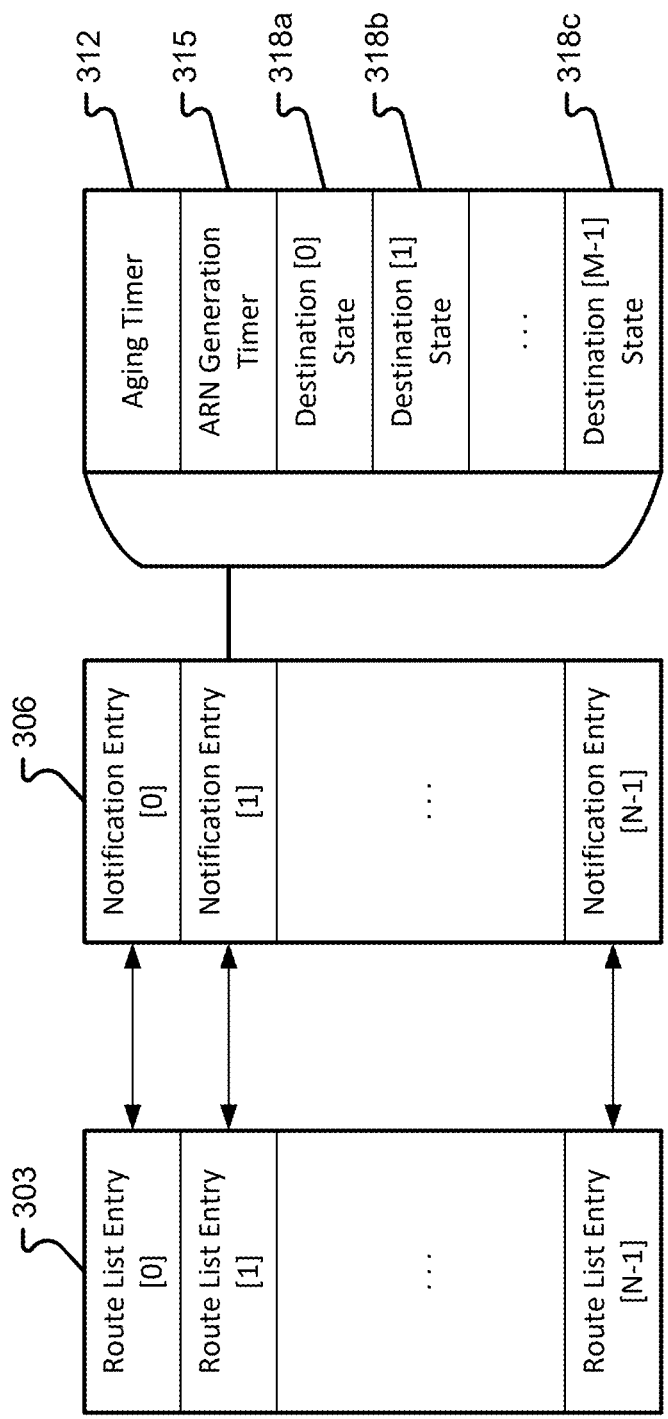
FIG. 3 illustrates table data in accordance with at least some embodiments of the present disclosure.

Table data 127 may include a route list table 303 and a state table 306 as illustrated in FIG. 3 and described below. As a switch 103 operates, the switch 103 may receive and generate congestion notifications and update the table data 127 based on received ARN packets as described below. Table data 127 may be used by switching hardware 109 to perform adaptive routing such as, when a packet is received, to determine from which port 106 the packet should be forwarded to reach the destination of the packet.

For example, as illustrated in FIG. 2, a number of switches 103a-f may be interconnected and also connected to nodes 203a-h to form a network. Each arrow in FIG. 2 may represent any number of one or more connections between the various elements. For example, ports of a first switch 103a may be connected to one or more ports of a second switch 103e, one or more ports of a third switch 103f, and one or more ports of each of nodes 203a and 203b. Each connection between a switch 103 and another switch 103 or node 203 may be used to carry multiple flows. Flows may also be static flows or adaptive routing flows. Static flows may be flows which cannot be rerouted via different routes through the network while adaptive routing flows may be flows which can be routed via a variety of different routes to reach the proper destination. As an example, each node 203a-h may transmit static flows and/or adaptive flows to other nodes 203a-h via the switches 103a-f.

As should be appreciated, the specific interconnections of the switches 103a-f and nodes 203a-h illustrated by FIG. 2 are provided for illustration purposes only and should not be considered as limiting in any way. While the network illustrated in FIG. 2 only includes 2 layers of switches 103, it should be appreciated additional layers may be introduced and switches may be interconnected in any conceivable manner. For example, in some implementations, a network as described herein may contain multiple switches 103 interconnected in a topology such as a Clos network or a fat tree topology network.

In a network of switches as described herein, remote congestion is a problem which may occur when data traverses the network. For example, in the network illustrated in FIG. 2, consider the scenario in which a first switch 103a and a second switch 103b are each sending large amounts of data to a third switch 103c via a spine switch 103e. The communication channels between the spine switch 103e and the third switch 103c may be operating at a high bandwidth and are experiencing congestion.

In the event that a fourth switch 103d receives a packet with a destination indicating node 203e or node 203f, the fourth switch 103d may determine the packet must be sent to the third switch 103c. However, in a conventional network, the fourth switch 103d, having not interacted with the spine switch 103e in some time, may be unaware of any congestion between the spine switch 103e and the third switch 103c. As a result, the fourth switch 103d may select the spine switch 103e for sending the packet to the third switch 103c. In this way, the fourth switch 103d may contribute to the congestion between the spine switch 103e and the third switch 103c. Meanwhile, the spine switch 103f may be operating in an underutilized manner.

This problem occurs particularly when one or more switches in a network either do not perform adaptive routing or are involved in sending static flows which cannot be rerouted. However, using the systems and methods described herein, switches 103 may be enabled to avoid remote congestion by rerouting data in an adaptive manner. The systems and methods disclosed herein provide a mechanism in which a congestion notification, which may be referred to as a remote congestion notification, is sent from one switch to other switches in the network, such that a better routing decision can be made by switches receiving the congestion notification. In this way, as described herein, the congestion notification may serve as a feedback loop by indicating whether the switch receiving the congestion notification should increase or decrease traffic towards a specific route in the network.

As an example, consider a scenario in the network of switches 103a-f illustrated in FIG. 2 in which congestion is occurring on the communication link from switch 103e to switch 103b. If switch 103e receives data directed to a node 203a, 203b, 203e-h which requires communicating via one of switches 103a, 103c, or 103d, such data will not contribute to the congestion. But if switch 103e receives data directed to a node 203b-203d which requires communicating via switch 103b, such data will contribute to the congestion.

In the event that the switch 103e receives a packet directed to a node 203b-203d, or otherwise requires communicating via the congested link with switch 103b, the switch 103e will, through a method as described herein, respond with a congestion notification packet towards the source instructing each switch 103 that receives the congestion notification to re-route traffic.

As described above, in adaptive routing there may be multiple paths between a source and a destination, along each path a packet is transferred between one or more switches, a switch (e.g., switch 1) is between another switch (e.g., switch 2) and the source when a packet is transferred from switch 2 to the switch 1 on a path towards the source. For example, in FIG. 2, between node 203a (e.g., a source) and node 203e (e.g., a destination), on one path are switches 103a, 103c, and 103c. On another path between node 203a and node 203e are switches 103a, 103f, and 103c. In other words, any of the switches 102a, 103e, 103f, and 103c are between the node 203a and the node 203c. Additionally, switches 103e, 103f, and 103a are between switch 103c and the node 203a.

Such a method may be enabled through the maintaining of tables of data as illustrated in FIG. 3. The data illustrated in FIG. 3 may be stored as table data 127 in memory 118 of a switch. A route list table 303 and a state table 306 as illustrated in FIG. 3 may contain data which may be used by a switch 103 to perform routing of packets.

Figure 4:
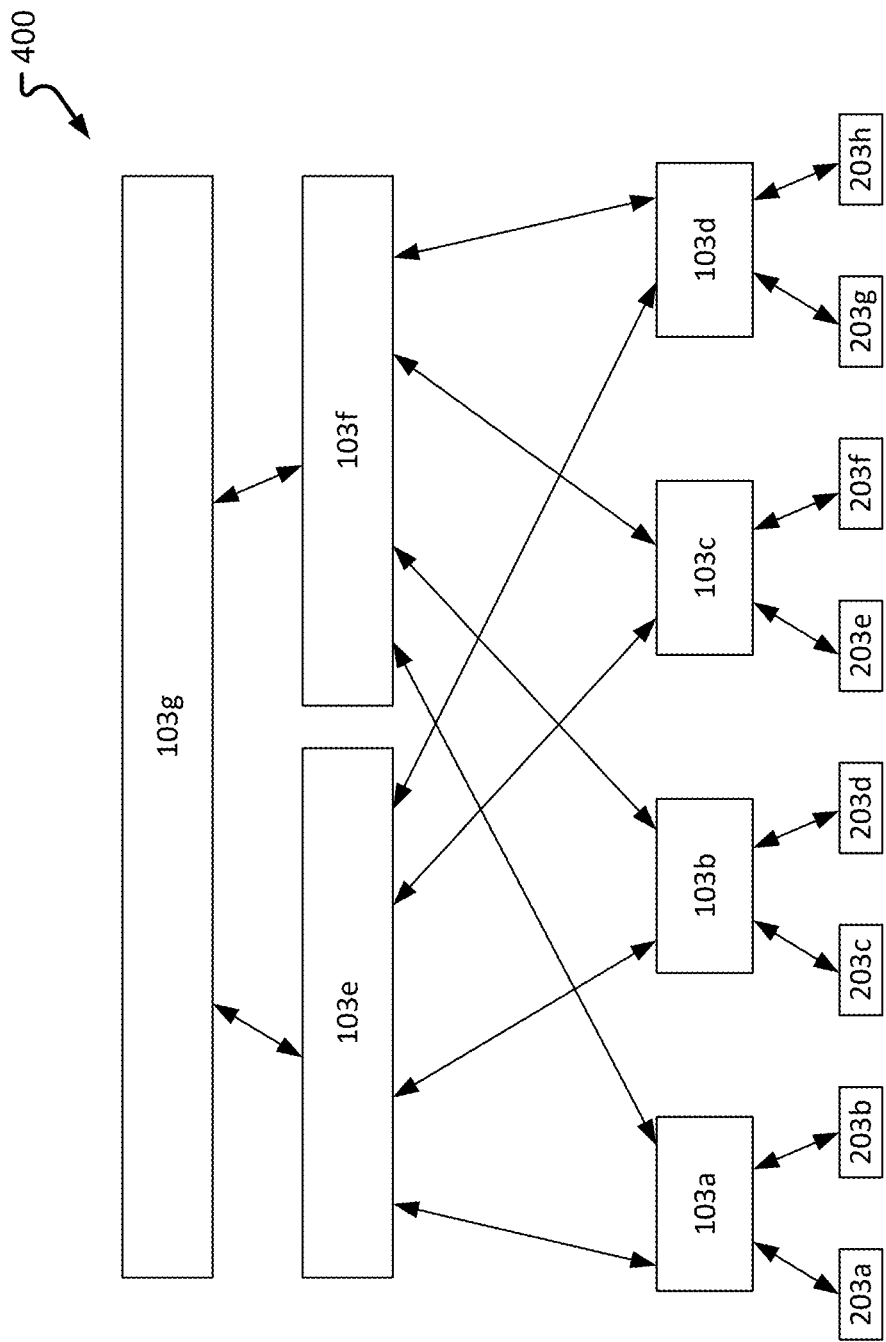
FIG. 4 illustrates a network of leaf switches and spine switches in accordance with at least some embodiments of the present disclosure.

A route list table 303 may list all possible routes for forwarding a packet. Each entry in the route list table may be associated with a different destination switch, or a switch on the same level as the switch maintaining the route list table 303. For example, if the switch maintaining the route list table 303 is a leaf switch, each of the other leaf switches in the network may be represented as an entry in the table. The route list table 303 in FIG. 3 includes one entry for each destination, or leaf switch, where the network includes N destinations. Such a network 400 is illustrated in FIG. 4.

It should be appreciated that in some implementations, entries in the route list table 303 may be associated with switches and/or other types of computing devices at any level of the network, such as final destination nodes, leaf switches, or other destinations. In some implementations, a route list table 303 may include an entry for each port of a switch.

The route list table 303 may store information about all possible routes for routing packets traversing the switch. The route list table 303 may be used by an adaptive routing mechanism to forward packets. Each switch in a network may store a respective routing table with an entry for each destination switch which will contain all the possible routes towards that destination.

A state table 306 may include data which may be updated in response to congestion notifications received from other switches. Each entry in the state table 306 may be associated with a respective entry in the route list table 303. Like the route list table 303 in FIG. 3, the state table 306 may include one entry for each destination, where the network includes N destinations.

Each entry in the state table 306 may include or be associated with a secondary table including an aging timer 312, a congestion notification generation timer 315, and a destination state 318a-c for each upper layer switch, such as spine switches, ToR switches, or other switches to which the switch holding the state table 306 in memory may send a packet when forwarding the packet.

In the example illustrated in FIG. 3, notification entry [1] includes M destination states 318. Each destination state 318a-c of the state table 306 may indicate a bandwidth for a respective destination of the plurality of destinations. The bandwidth may be an integer and may indicate a bandwidth in terms of percentage or bits per second for example which should be sent towards the destination.

In some implementations, each destination state 318a-c of the table may be associated with a maximum bandwidth and a minimum bandwidth. For example, a minimum bandwidth may be zero bits per second while a maximum bandwidth may be a maximum capability of the switch.

Each entry in the state table 306 may be associated with an aging timer 312. The aging timer 312 may be used to effectively reduce the effect of a received congestion notification over time by linearly or exponentially reducing values written in each destination state 318a-c of the state table 306. As a result, by using the aging timer 312, the switch will forget congestion notification information if the switch does not become congested within a predetermined amount of time. For example, a switch receives a congestion notification packet and becomes congested within 2 ms, in response to the switch becoming congested within the predetermined amount of time, the switch generates and transfers a congestion notification packet. Alternatively, if the switch does not become congested within the predetermined amount of time (e.g., 2 ms), then the information from the congestion notification packet is forgotten. In embodiments, the predetermined time may be user configurable or determined by the system.

Figure 5:
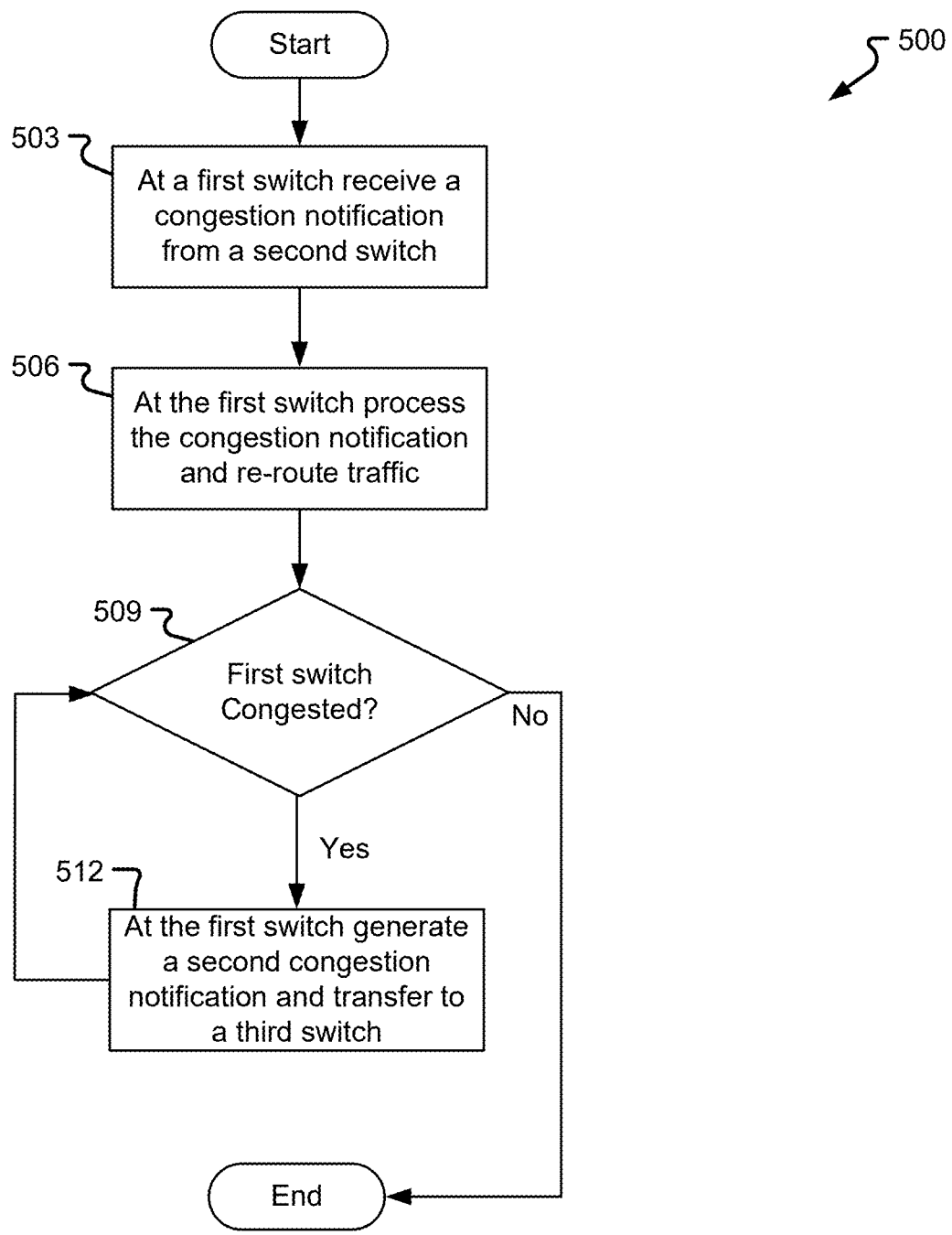
FIG. 5 is a flow diagram depicting a method in accordance with at least some embodiments of the present disclosure.

As illustrated in FIG. 5, a switch 103 may perform a method 500 of generating and transferring congestion notification (e.g., Adaptive Routing Notification packets) in response to congestion. The method 500 may begin at step 503 when the switch 103 receives a congestion notification packet from a second switch 103. For example, the switch 103d is congested and send a congestion notification packet to the switch 103f. In embodiments, the first switch (e.g., the switch 103f) is between the second switch 103 that is congested (e.g., the switch 103d) and the source of the packet that caused the second switch 103 (e.g., the switch 103d) to become congested.

At step 506 the switch 103 (e.g., the switch 103f) processes the congestion notification packet from the second switch 103 (e.g., the switch 103d). In embodiments, processing the congestion notification may include adaptively re-routing traffic to try to eliminate the congestion in the switch 103d. At 509 it is determined if the first switch 103 (e.g., the switch 103f) has also become congested. If the first switch 103 (e.g., the switch 103f) is not congested (No), then the method 500 ends. In embodiments, the first switch 103 (e.g., the switch 103f) may set a timer when it receives the congestion notification from the second switch 103 (e.g., the switch 103d), and checks for congestion during the timer.

If the first switch 103 (e.g., the switch 103f) is congested (Yes), at 512 the first switch 103 (e.g., the switch 103f) generates and transfers a second congestion notification to be sent to a third switch 103 (e.g., any or all of the switches 103a-c). In embodiments, the third switch 103 is between the first switch 103 (e.g., the switch 103f) the source of the packet that caused the second switch (e.g., the switch 103d) to become congested. The first switch 103 (e.g., the switch 103f) may repeat steps 509 and 512 until the first switch 103 (e.g., the switch 103f) is not congested. The method 500 may be performed by the third switch 103.

Determining a congestion associated with a switch 103 may involve determining a queue latency or a queue occupancy for a queue 121a-c associated with the port 106a-c from which the packet is to be sent from the switch 103. A queue latency as used herein may refer to an amount of time data (e.g., packets) spends in a queue 121 before being transmitted from a switch 103. A high queue latency may suggest that the outgoing link is currently congested and/or unable to handle additional traffic. For example, queue latency for a queue 121a associated with the port 106a may refer to an amount of time data spends in the queue 121a before being transmitted from the switch 103. Queue occupancy as used herein may refer to an amount of data (e.g., a number of packets or a number of bytes) in a queue 121 waiting to be sent from a switch 103. A high queue occupancy may suggest that the outgoing link is currently congested and/or unable to handle additional traffic. For example, a queue occupancy for a queue 121a associated with the port 106a may refer to an amount of data waiting in the queue 121a to be sent from the switch 103. In some implementations, a switch 103 may measure congestion level towards each the destination using a combination of queue latency and queue occupancy. In some implementations, the switch 103 may be enabled to convert one or both of the queue latency and queue occupancy into a number which can be compared to one or more thresholds. The switch 103 may compare the congestion, for example based on the queue latency and/or occupancy, to a range consisting of an upper threshold and a lower threshold.

Continuing the example above, the second congestion notification generated at 512 is sent to 103b, however, in this example, the relevant switch that can resolve the congestion is the switch 103a, therefore, since the congestion notification generated at 512 is sent to the switch 103b and not the switch 103a, and the congestion is not resolved. The step 512 is repeated until the congestion is resolved. In embodiments, the switch 103 may set a timer (e.g., ARN generation timers 315) when the second congestion notification is sent, and re-sends the congestion notification if the congestion is not resolved at the end of the timer. The method 500 is repeated by each switch 103 that consumes a congestion notification packet.

In embodiments, the method 500 may be stored as congestion management instructions 129 in memory 118 of a switch.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:
1. A system comprising:
   a first switch comprising one or more circuits to:
      receive a congestion notification from a second switch, wherein the congestion notification is addressed to a source node, and wherein the first switch is between the second switch and the source node;

process the congestion notification and re-route network traffic based on the congestion notification;
in response to the first switch entering a congested state within a predetermined amount of time after receiving the congestion notification, generate a second congestion notification; and
transfer the second congestion notification to a third switch, wherein the second congestion notification is addressed to the source node, and wherein the third switch is between the first switch and the source node.

2. The system of claim 1, wherein the one or more circuits are further to:
in response to congestion in the first switch not being resolved within a predetermined amount of time, re-sending the second congestion notification.

3. The system of claim 1, wherein congestion in the second switch is a result of link congestion or link failure.

4. The system of claim 1, wherein when the first switch is directly connected to the source node, the second congestion notification is not generated or transferred.

5. The system of claim 1, wherein the one or more circuits are further to:
generate the second congestion notification in response to determining at least one port in the first switch and an associated bandwidth are below a threshold.

6. The system of claim 1, wherein congestion in the first switch is determined based on one or more of a queue latency and a queue occupancy.

7. The system of claim 1, wherein re-routing the network traffic comprises using adaptive routing to re-route the network traffic.

8. The system of claim 1, wherein the congestion notification comprises an Adaptive Routing Notification (ARN).

9. A device comprising one or more circuits to:
receive a congestion notification from a second device, wherein the congestion notification is addressed to a source node, and wherein the device is between the second device and the source node;
process the congestion notification and re-route network traffic based on the congestion notification;
in response to the device entering a congested state within a predetermined amount of time after receiving the congestion notification, generate a second congestion notification; and
transfer the second congestion notification to a third device, wherein the second congestion notification is addressed to the source node, and wherein the third device is between the device and the source node.

10. The device of claim 9, wherein when the device is connected to the source node, the second congestion notification is not generated or transferred.

11. The device of claim 9, wherein the congestion notification is generated in response to determining at least one port in the second device and an associated bandwidth are below a threshold.

12. The device of claim 9, wherein the congestion in the second device is determined based on one or more of a queue latency and a queue occupancy.

13. The device of claim 9, wherein re-routing the network traffic comprises using adaptive routing to re-route the network traffic.

14. The device of claim 9, wherein the congestion notification comprises an Adaptive Routing Notification (ARN).

15. A network comprising:
a first device comprising one or more circuits to:
receive a congestion notification from a second device, wherein the congestion notification is addressed to a source node, and wherein the first device is between the second device and the source node;
process the congestion notification and re-route network traffic based on the congestion notification;
in response to the first device entering a congested state within a predetermined amount of time after receiving the congestion notification, generate a second congestion notification; and
transfer the second congestion notification to a third device, wherein the second congestion notification is addressed to the source node, and wherein the third device is between the first device and the source node.

16. The network of claim 15, wherein when the first device is connected to the source node, the second congestion notification is not generated or transferred.

17. The network of claim 15, wherein the congestion notification is generated in response to determining at least one port in the second device and an associated bandwidth are below a threshold.

18. The network of claim 15, wherein congestion in the second device is determined based on one or more of a queue latency and a queue occupancy.

19. The network of claim 15, wherein re-routing the network traffic comprises using adaptive routing to re-route the network traffic.

20. The network of claim 15, wherein the congestion notification comprises an Adaptive Routing Notification (ARN).

* * * * *